(12) United States Patent
Neichev et al.

(10) Patent No.: US 9,471,336 B2
(45) Date of Patent: Oct. 18, 2016

(54) MECHANISM FOR DELIVERY OF HELP CONTENT TO A CLOUD LANDSCAPE

(71) Applicants: Nikolai Neichev, Sofia (BG); Stoyan Boshev, Sofia (BG); Krum Valkov, Shoumen (BG); Georgi D. Dimitrov, Kyustendil (BG)

(72) Inventors: Nikolai Neichev, Sofia (BG); Stoyan Boshev, Sofia (BG); Krum Valkov, Shoumen (BG); Georgi D. Dimitrov, Kyustendil (BG)

(73) Assignee: SAP SE, Walldorf (DE)

( * ) Notice: Subject to any disclaimer, the term of this patent is extended or adjusted under 35 U.S.C. 154(b) by 329 days.

(21) Appl. No.: 14/077,800

(22) Filed: Nov. 12, 2013

(65) Prior Publication Data

US 2015/0134686 A1    May 14, 2015

(51) Int. Cl.
*G06F 9/44*  (2006.01)
*G06F 17/30* (2006.01)

(52) U.S. Cl.
CPC .......... *G06F 9/4446* (2013.01); *G06F 17/30* (2013.01); *G06F 17/3002* (2013.01)

(58) Field of Classification Search
None
See application file for complete search history.

(56) References Cited

U.S. PATENT DOCUMENTS

| | | | |
|---|---|---|---|
| 7,158,965 B1 * | 1/2007 | Greenberg | G06F 9/4446 |
| 7,284,189 B1 | 10/2007 | Lawrence et al. | |
| 7,562,341 B2 | 7/2009 | Kovachka-Dimitrova et al. | |
| 7,711,607 B2 | 5/2010 | Agassi et al. | |
| 7,865,829 B1 | 1/2011 | Goldfield et al. | |
| 8,069,413 B2 | 11/2011 | Methot | |
| 8,386,932 B2 | 2/2013 | Shewchuk | |
| 8,538,947 B2 | 9/2013 | Matejka et al. | |
| 2004/0103085 A1 * | 5/2004 | Ly | G06F 17/3089 |
| 2006/0117315 A1 | 6/2006 | Bussert et al. | |
| 2007/0179841 A1 | 8/2007 | Agassi et al. | |
| 2007/0185976 A1 | 8/2007 | Solis | |
| 2008/0201705 A1 * | 8/2008 | Wookey | G06F 8/68 717/175 |
| 2008/0229199 A1 * | 9/2008 | Richardson | G06F 17/30943 715/714 |
| 2008/0306957 A1 * | 12/2008 | Brown | G06F 17/30067 |
| 2010/0095197 A1 | 4/2010 | Klevenz et al. | |
| 2011/0307780 A1 | 12/2011 | Harris et al. | |
| 2012/0131101 A1 | 5/2012 | Said et al. | |
| 2012/0137212 A1 * | 5/2012 | Baumann | G06F 8/30 715/239 |
| 2012/0317197 A1 | 12/2012 | Foy et al. | |
| 2013/0007090 A1 | 1/2013 | Sankararaman | |
| 2013/0159984 A1 | 6/2013 | Misovski et al. | |
| 2014/0181652 A1 * | 6/2014 | Stanke | G06F 9/4446 715/708 |
| 2015/0095885 A1 * | 4/2015 | Louvau | G06F 17/30424 717/120 |

OTHER PUBLICATIONS

Pahl et al. "Ontology-based composition and matching for dynamic cloud service coordination." International Journal of Metadata, Semantics and Ontologies 6.3-4 (2011): 195-206. Retrieved on [Aug. 6, 2016] Retrieved from the Internet: URL<http://doras.dcu.ie/17107/1/ijmso11.pdf>.*

(Continued)

*Primary Examiner* — Thuy Dao
*Assistant Examiner* — Cheneca Smith
(74) *Attorney, Agent, or Firm* — Buckley, Maschoff & Talwalkar, LLC

(57) ABSTRACT

According to some embodiments, an apparatus and a method of capturing a type of file associated with a software deliverable is provided. A software deliverable is scanned for a predetermined type of file, a first file of the predetermined type of file is determined to exist in the software deliverable and the first file of the predetermined type of file is copied to a repository.

14 Claims, 5 Drawing Sheets

(56) References Cited

OTHER PUBLICATIONS

Hasan et al. A Metadata-orientated Integrated Approach to Personal File Management. 2012 8th International Conference onComputing Technology and Information Management (ICCM). Apr. 2012, pp. 459-464. Retrieved on [Aug. 6, 2016] Retrieved from the Internet: URL<http://ieeexplore.ieee.org/stamp/stamp.jsp?tp=&arnumber=6268542>.*

* cited by examiner

| 400 | 401 | 402 |
|---|---|---|
| | Software | Scan For Help Content |
| | X | Yes |
| | Y | No |
| | Z | Yes |

FIG. 4

| 500 | 501 | 502 |
|---|---|---|
| | Software | Version |
| | X | 1.7 |
| | Y | 2.3 |
| | Z | 6.7A |

FIG. 5

MECHANISM FOR DELIVERY OF HELP CONTENT TO A CLOUD LANDSCAPE

BACKGROUND

Software that is executed in a cloud landscape may include many different software applications within the landscape which are developed by different organizations. Since each software application may be developed by a different organization, the documentation associated with each software application is also delivered by those different organizations.

Each of the different organizations delivers help content for its software application, but the help application that publishes the help content so that it is visible to a user may belong to a single organization. Because of this, each organization may not have control over the delivery of the help content related to their particular software application since the organization that controls the publication of the help content may not know when to update the help content. Because of this, a software application and its related help content may be out of sync.

BRIEF DESCRIPTION OF THE DRAWINGS

FIG. 4 illustrates a portion of a database according to some embodiments.

FIG. 5 illustrates a portion of a database according to some embodiments.

DETAILED DESCRIPTION

The present embodiments relate to a method, apparatus and system associated with facilitating the delivery of help content from a plurality of organizations to a single help application within a landscape. Each software application associated with a landscape may use a deploy phase to deliver content (e.g., new application binaries). The present embodiments relate to using a deploy listener to scan the content being deployed to the landscape. If the deployed content contains help content, the help content may be extracted and stored in a repository. The help content may later be sent to a help application for users to visualize the help content.

Figure 1:
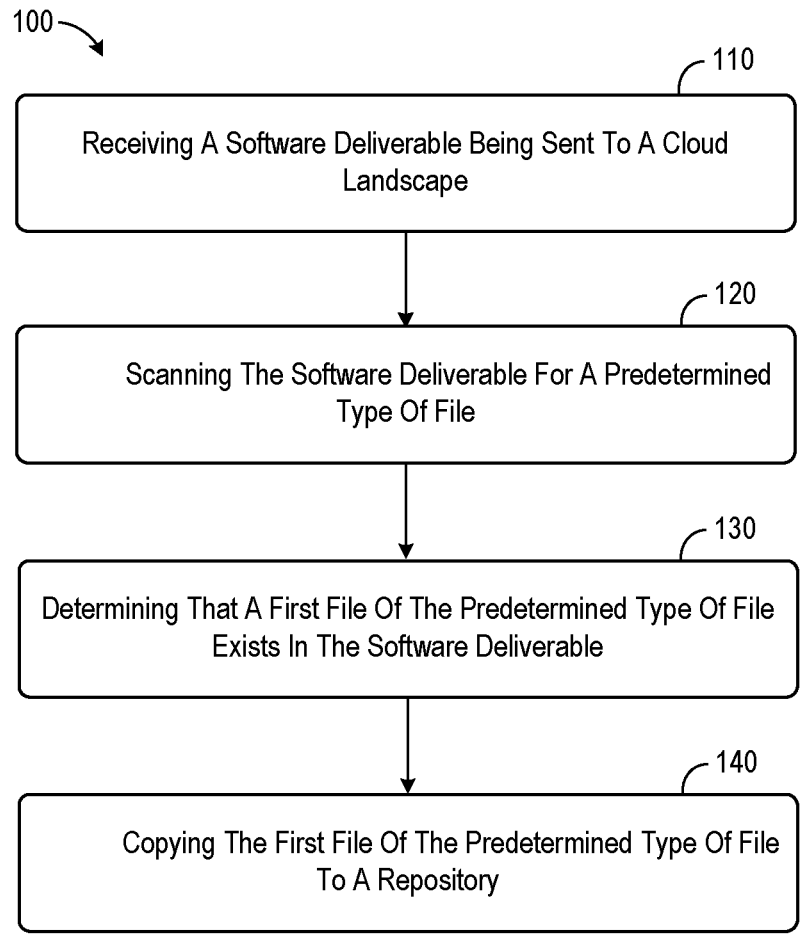
FIG. 1 illustrates a method according to some embodiments.

Referring now to FIG. 1, an embodiment of a method 100 is illustrated. The method 100 may be embodied on a non-transitory computer-readable medium. Furthermore, the method 100 may be performed by an apparatus such as, but not limited to, the apparatus of FIG. 6.

At 110, a software deliverable being sent to a cloud landscape is received. The software deliverable may be software that will be executed within a cloud landscape. The software deliverable may have a specific designated folder or area within the software deliverable that stores help content.

Figure 2:
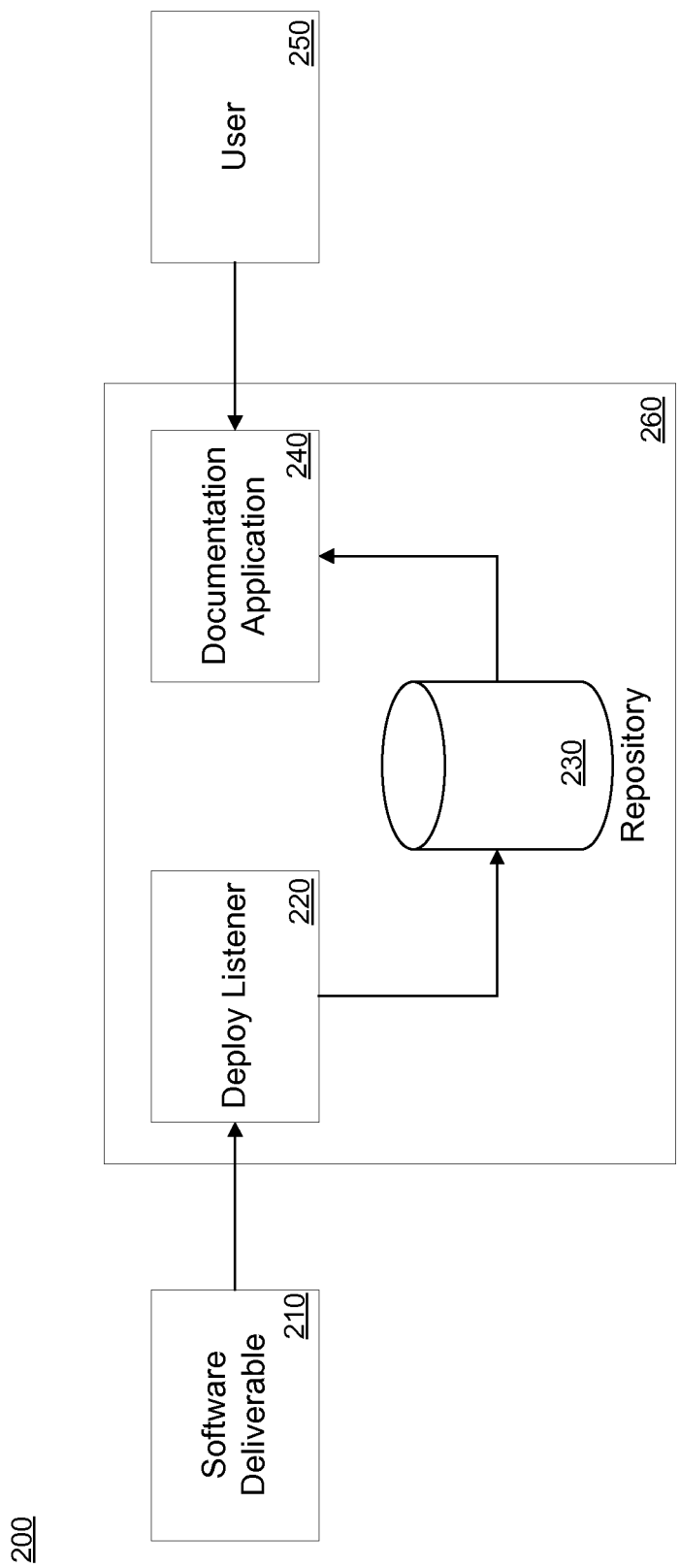
FIG. 2 illustrates a system according to some embodiments.

For illustrative purposes, and to aid in understanding features of the specification, an example will be introduced. This example is not intended to limit the scope of the claims. Now referring to FIG. 2, an embodiment of a system 200 is illustrated. As illustrated in FIG. 2, a software deliverable 210 may be sent to a cloud landscape 260.

Referring back to FIG. 1, at 120 the software deliverable may be scanned for a predetermined type of file. In some embodiments, the software deliverable may be scanned via a processor such as the processor described with respect to FIG. 6. Scanning the software deliverable may be performed by a deploy listener that scans specific areas or folders of the software deliverable based on (a) a type of file that the deploy listener is indicated to scan for and (b) a type of software deliverable being received.

In one embodiment, the predetermined type of file is related to software help content. Software help content may comprise a series of html links that link to specific topics about a landscape based software application. The help content may comprise a documentation component of the landscape based software application and may (1) explain features of the landscape based software application and/or (2) help a user understand the software's capabilities. The purpose of the help content may be to provide answers that a user needs to understand in order to use the landscape based software application effectively. In some embodiments, the predetermined type of file is a HyperText Markup Language ("HTML") file. Furthermore, scanning may be based on a set of rules. For example, the rules may be associated with indicating a particular directory where a predetermined type of file is stored and/or that scanning may be limited to specific software deliverables.

Continuing with the above example, and again referring to FIG. 2, a deploy listener 220 may scan the software deliverable 210 for a predetermined type of file (e.g., a HTML file) that is located in a specific directory. For example, HTML files (e.g., help content) may be stored in a first directory while Extensible Markup Language ("XML") files (e.g., help content) may be stored in a second directory. In this regards, the deploy listener may scan a predetermined location in a software deliverable.

The deploy listener 220 may determine which software deliverables 210 should be scanned based on a "white list". For example, and referring to FIG. 4, an embodiment of a table 400 (e.g., a white list of files) is illustrated. The table comprises a software ID field 401 and a scan indicator field 402. The table 400 indicates three software deliverables for software X, software Y and software Z. As indicated in the scan indicator field 402, software X and software Z will be scanned for a specific type of file while software Y will not be scanned.

At 130, a first file of the predetermined type of file is determined to exist in the software deliverable. The determination may be made via a processor such as the processor described with respect to FIG. 6. The first file of the predetermined type of file may be copied to a repository at 140.

Continuing with the above example, and again referring to FIG. 2, the deploy listener 220 may determine that a first file of the predetermined type of file exists in the software deliverable 210. The deploy listener 220 then copies the first file to a repository 230. For example, if the deploy listener 220 is scanning for HTML files it will scan for files in the first directory of the software deliverable 210. If the deploy listener 220 determines that an HTML file exists in the first directory then the deploy listener 220 will copy the contents of the directory into the repository. Else, the deploy listener 220 will scan a next software deliverable.

Since conventional methods may lead to help files being out of sync with the actual software application, the present embodiments may provide an advantage over conventional methods by keeping software applications and their related help content synchronized. In the present embodiments, the integration and update of the help content is transparent to the users and transparent to an individual who deploys the software application thus and does not require any additional efforts by them.

The deploy listener code snippet below may be used to traverse the software deliverable, find the help content within it, extract the help content into the repository, and check if the authorizations for providing help content are in place.

```
public class WebApplicationDeployListener implements IDeployListener {
...
    @Override
    public void deployedApplicationBinaries(String account, String application, String component, String userID,
                List<URI> apps, String operationID) throws
                DeployListenerException {
        logger
            .debug(String
                .format(
                    "Method deployedWebApplicationBinaries called for account: %s, application: %s, component: %s, userID: %s, operationID: %s",
                    account, application, component, userID,
                    operationID));
        try {
            if (isAppInWhiteList(account, application)) {
                storeDocuSetsInRepo(apps,
                    DOCUSETS_RELATIVE_PATH);
            } else
                logger.debug("Currently deploying Account: " +
account + " and Application: " + application
                    + " are not in docu white list and no
                    documentation will be extracted.");
        } catch (Exception e) {
            logger.error("Problem while storing documentation
                into repository", e);
            throw new DeployListenerException("Problem while
storing documentation into repository", e);
        }
    }
...
}
```

Figure 3:
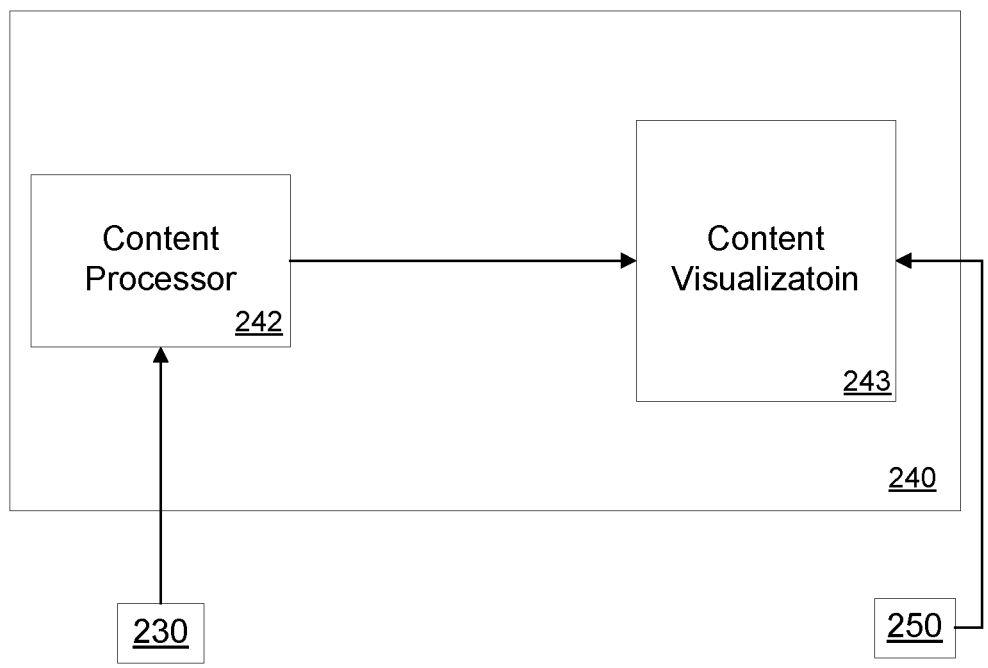
FIG. 3 illustrates a document engine according to some embodiments.

Referring to FIG. 2 and FIG. 3, once help content is stored in the repository 230 a documentation engine 240 (e.g., a dynamic help content integration engine) may update the help content in a content visualization engine 243 for a user 250 to visualize without application downtime in the landscape.

The documentation engine 240 may receive, or pull content from the repository 230 and integrate the content in a help application (e.g., the content visualization engine 243), thus the help application is updated with the new help content dynamically. In some embodiments, the content visualization engine 243 may act as a web service to visualize help content to one or more users.

The documentation engine 240 may comprise a content processor 242 and the content visualization engine 243. The content processor 242 may make periodic checks of the repository for new or updated help content. The content processor 242 may compare the help content that is currently contained in the help application with the help content on the repository. The comparison may be based on versioning metadata associated with each software application's help content. The metadata may comprise a name identifier and a version identifier. The documentation engine 240 may synchronize the help content if the help content residing on the repository is considered to be a newer file (e.g., based on the metadata). As illustrated in FIG. 5, the content processor 242 may be associated with a database or table 500 that comprises metadata associated with help content. The table 500 may comprise a software identifier field 501 and a version identifier field 502. For example, a help application may have help content for application X which is indicated as version 1.7. Likewise, the help application may have help content for application Y as version 2.3 and application Z as 6.7A. If, for example, new help content for application X with a version of 1.8 was stored in the repository, the content processor 242 may determine that version 1.8 is a newer version than the currently saved 1.7. The content processor 242 may then retrieve the help content associated with application X from the repository and store version 1.8 of the help content in the content visualization engine 243 for the user 250 to view.

The following synchronization manager code snippet illustrates the logic of a check for new help content in the repository 230. When new help content is retrieved from the repository 230 the "updateDocuments( )" handles the update of the content in the help application and the related metadata for the documentation version.

```
public class SynchronizationManager implements Runnable {
    private static final Logger LOG =
LoggerFactory.getLogger(SynchronizationManager.class);
...
    @Override
    public void run( ) {
        LOG.info("Synchronization manager thread started.");
        while (continueRun) {
            try {
                Thread.sleep(sleepInterval);
                updateDocuments( );
            } catch (InterruptedException e) {
                LOG.warn("Interrupted exception occured for some
                    reason", e);
            } catch (IllegalStateException ile) {
                LOG.warn("Update of documentation is in process",
                    ile);
            } catch (Exception ex) {
                LOG.error("Unexpected exception during operation",
                    ex);
            }
        }
        LOG.info("Synchronization manager thread stopped.");
    }
    private void updateDocuments( ) {
        List<DocuSet> docusetsForUpdate =
        adapter.getDocumentsForUpdate(lastModified);
        LOG.debug("Documents for update: " +
        docusetsForUpdate.size( ));
        for (DocuSet currentDocuSet : docusetsForUpdate) {
            try {
                LOG.info("Updating docuset: " +
                currentDocuSet.getNameAndVersion( ));
                new ContentModificator(currentDocuSet,
                    getWebContentLocation( ),
adapter.getDocument(currentDocuSet)).modify( );
                if (currentDocuSet.getLastModified( ) >
                lastModified) {
                    lastModified =
                    currentDocuSet.getLastModified( );
                }
                updateVersionInfo(currentDocuSet);
                clearObsoleteDocusets(currentDocuSet);
            } catch (Exception ex) {
                LOG.error("Unexpected exception during processing
of docuset: " + currentDocuSet.getNameAndVersion( ), ex);
            }
        }
        storeLastmodified(lastModified);
    }
...
}
```

Figure 6:
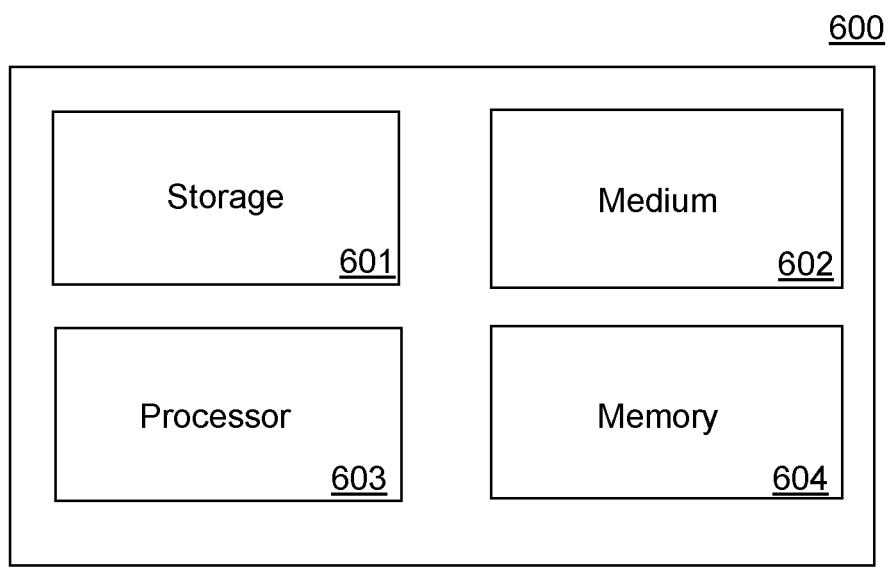
FIG. 6 illustrates an apparatus according to some embodiments.

Now referring to FIG. 6, an embodiment of an apparatus 600 is illustrated. In some embodiments, the apparatus 600 may be associated with a deploy listener or a documentation engine.

The apparatus 600 may comprise a storage device 601, a medium 602, a processor 603, and a memory 604. According to some embodiments, the apparatus 600 may further comprise a digital display port, such as a port adapted to be coupled to a digital computer monitor, television, portable display screen, or the like.

The medium 602 may comprise any computer-readable medium that may store processor-executable instructions to be executed by the processor 603. For example, the medium 602 may comprise a non-transitory tangible medium such as, but not limited to, a compact disk, a digital video disk, flash memory, optical storage, random access memory, read only memory, or magnetic media.

A program may be stored on the medium 602 in a compressed, uncompiled and/or encrypted format. The program may furthermore include other program elements, such as an operating system, a database management system, and/or device drivers used by the processor 603 to interface with peripheral devices.

The processor 603 may include or otherwise be associated with dedicated registers, stacks, queues, etc. that are used to execute program code and/or one or more of these elements may be shared there between. In some embodiments, the processor 603 may comprise an integrated circuit. In some embodiments, the processor 603 may comprise circuitry to perform a method such as, but not limited to, the method described with respect to FIG. 1.

The processor 603 communicates with the storage device 601. The storage device 601 may comprise any appropriate information storage device, including combinations of magnetic storage devices (e.g., a hard disk drive), optical storage devices, flash drives, and/or semiconductor memory devices. The storage device 601 stores a program for controlling the processor 603. The processor 603 performs instructions of the program, and thereby operates in accordance with any of the embodiments described herein. For example, the processor 603 may determine if a first file of the predetermined type of file exists in a software deliverable.

The main memory 604 may comprise any type of memory for storing data, such as, but not limited to, a flash driver, a Secure Digital (SD) card, a micro SD card, a Single Data Rate Random Access Memory (SDR-RAM), a Double Data Rate Random Access Memory (DDR-RAM), or a Programmable Read Only Memory (PROM). The main memory 604 may comprise a plurality of memory modules.

As used herein, information may be "received" by or "transmitted" to, for example: (i) the apparatus 600 from another device; or (ii) a software application or module within the apparatus 600 from another software application, module, or any other source.

In some embodiments, the storage device 601 stores a database (e.g., including information associated with help content versions and/or a white list of files). Note that the database described herein is only an example, and additional and/or different information may be stored therein. Moreover, various databases might be split or combined in accordance with any of the embodiments described herein.

Embodiments have been described herein solely for the purpose of illustration. Persons skilled in the art will recognize from this description that embodiments are not limited to those described, but may be practiced with modifications and alterations limited only by the spirit and scope of the appended claims.

What is claimed is:

1. A method of capturing a type of file associated with a software deliverable, the method comprising:
   receiving a software deliverable being sent to a cloud landscape;
   scanning, via a processor, a directory associated with the software deliverable for a predetermined type of file based on rules associated with a type of software deliverable where the rules indicate a particular directory to store the predetermined type of file;
   determining, via the processor, that a first file of the predetermined type of file exists in the directory associated with the software deliverable;
   comparing the first file of the predetermined type with an existing file is a repository based on versioning metadata associated with the first file of the predetermined type and versioning metadata associated the existing file; and
   based on the directory associated with the software deliverable comprising the first file of the predetermined type of file and in a case that the comparison indicates that the first file of the predetermined type is newer than the existing file, copying the contents of the directory to the repository.

2. The method of claim 1, wherein the predetermined type of file is related to software help content.

3. The method of claim 2, wherein the predetermined type of file is an HTML file.

4. The method of claim 1, wherein scanning is based on determining if the software deliverable is indicated on a list of software deliverables that are to be scanned.

5. The method of claim 1, further comprising:
   periodically checking the repository for newly copied files; and
   in a case that it is determined that a newly copied file exists, publishing the newly copied files.

6. A non-transitory computer-readable medium comprising instructions that when executed by a processor perform a method of capturing a type of file associated with a software deliverable, the method comprising:
   receiving a software deliverable being sent to a cloud landscape;
   scanning, via a processor, a directory associated with the software deliverable for a predetermined type of file based on rules associated with a type of software deliverable where the rules indicate a particular directory to store the predetermined type of file;
   determining, via the processor, that a first file of the predetermined type of file exists in the directory associated with the software deliverable;
   comparing the first file of the predetermined type with an existing file is a repository based on versioning metadata associated with the first file of the predetermined type and versioning metadata associated the existing file; and
   based on the directory associated with the software deliverable comprising the first file of the predetermined type of file and in a case that the comparison indicates that the first file of the predetermined type is newer than the existing file, copying the contents of the directory to the repository.

7. The medium of claim 6, wherein the predetermined type of file is related to software help content.

8. The medium of claim 7, wherein the predetermined type of file is an HTML file.

9. The medium of claim 6, wherein scanning is based on determining if the software deliverable is indicated on a list of software deliverables that are to be scanned.

10. The medium of claim 6, further comprising:
periodically checking the repository for newly copied files; and
in a case that it is determined that a newly copied file exists, publishing the newly copied files.

11. An apparatus comprising:
a processor; and
a non-transitory computer-readable medium comprising instructions that when executed by a processor perform a method of capturing a type of file associated with a software deliverable, the method comprising:
receiving a software deliverable being sent to a cloud landscape;
scanning, via the processor, a directory associated with the software deliverable for a predetermined type of file based on rules associated with a type of software deliverable where the rules indicate a particular directory to store the predetermined type of file;
determining, via the processor, that a first file of the predetermined type of file exists in the directory associated with the software deliverable;
comparing the first file of the predetermined type with an existing file is a repository based on versioning metadata associated with the first file of the predetermined type and versioning metadata associated the existing file; and
based on the directory associated with the software deliverable comprising the first file of the predetermined type of file and in a case that the comparison indicates that the first file of the predetermined type is newer than the existing file, copying the contents of the directory to the repository.

12. The apparatus of claim 11, wherein the predetermined type of file is related to software help content.

13. The apparatus of claim 12, wherein the predetermined type of file is an HTML file.

14. The apparatus of claim 11, wherein scanning is based on determining if the software deliverable is indicated on a list of software deliverables that are to be scanned.

* * * * *